United States Patent [19]

Murata et al.

[11] Patent Number: 4,962,524
[45] Date of Patent: Oct. 9, 1990

[54] CORDLESS TELEPHONE APPARATUS AND A METHOD OF CONTROLLING SAME

[75] Inventors: Yoshitoshi Murata, Yokohama; Yuji Ohta, Suita; Akio Yotsutani; Toshihiro Hara, both of Tokyo; Koji Ono; Shoji Fuse, both of Hachioji, all of Japan

[73] Assignees: Nippon Telegraph and Telephone Corporation; NEC Corporation, both of Tokyo; Kabushiki Kaisha Toshiba, Kawasaki, all of Japan

[21] Appl. No.: 201,204

[22] Filed: Jun. 2, 1988

[30] Foreign Application Priority Data

Jun. 3, 1987 [JP] Japan ................................. 62-139455

[51] Int. Cl.⁵ .............................................. H04Q 7/04
[52] U.S. Cl. .......................................... 379/61; 379/63
[58] Field of Search ..................... 379/61, 63, 58, 62, 379/59, 60

[56] References Cited

U.S. PATENT DOCUMENTS

| 4,640,987 | 3/1987 | Tsukada et al. | 379/62 |
| 4,650,931 | 3/1987 | Tsukada et al. | 379/61 |
| 4,672,658 | 6/1987 | Kavehrad et al. | 379/63 |
| 4,741,019 | 4/1988 | Takahashi | 379/61 |

Primary Examiner—Robert Lev
Attorney, Agent, or Firm—Finnegan, Henderson, Farabow, Garrett, and Dunner

[57] ABSTRACT

A cordless telephone having a base unit and a plurality of radio telephone sets. The base unit delivers a ringing signal from a telephone line to a radio telephone set which is in telephone communication with a remote subscriber coupled to the telephone network, and a receiving radio telephone set in accordance with a request for transfer by the transferring radio telephone set. If the receiving radio telephone set responds to the ringing signal and goes off-hook, the telephone communication is transferred to the receiving radio telephone set from the transferring radio telephone set. If the receiving radio telephone set does not respond or does not go off-hook, the transferring radio telephone set responds to the ringing signal and goes off-hook to carry on the telephone communication.

18 Claims, 9 Drawing Sheets

CORDLESS TELEPHONE APPARATUS AND A METHOD OF CONTROLLING SAME

BACKGROUND OF THE INVENTION

1. Field of the Invention

The present invention relates to cordless telephone apparatuses which includes a single base unit connected to a telephone subscriber line, and a plurality of radio telephone sets which are coupled locally by a radio circuit to the base unit, and methods of controlling the same and, more particularly, to apparatus and methods of controlling the same, which is adapted for transfer responding to a request of the active communication with the remote party (or subscriber) from the currently active radio telephone set to another one of the local radio telephone sets.

2. Description of the Related Art

In such cordless telephone apparatuses, when a first of the plurality of radio telephone sets in the apparatus is in telephone communication with a remote party through the telephone network, and the telephone communication needs to be transferred to a second one of the plurality of local radio telephone sets, in order to keep the active DC (Direct Current) loop from the network closed to maintain the network connection with the remote party, the first radio telephone set which transfers the telephone communication first performs a predetermined hold operation. The base unit holds the DC loop closed and sends a predetermined hold signal or the like indicative of that fact to the telephone set of the remote party.

Subsequently, the transferring first radio telephone set dials an extension number of the second radio telephone set which is to receive the transferred telephone communication and then, assuming that the second set goes off-hook, the first set ends its off-hook condition, that is, goes on-hook so that it no longer is in communication with the remote party.

In more detail, when the base unit receives a signal indicative of the dialed extension number of the receiving second radio telephone set from the transferring first radio telephone set, it establishes a radio circuit between the base unit and the receiving second radio telephone set and sends a ringing signal to the receiving second radio telephone set.

A bell rings at the receiving second radio set in response to the ringing signal. When the receiving second radio telephone set goes off-hook in response to the bell ringing, the base unit stops sending the ringing signal and establishes a communication channel between the receiving second radio telephone set and the office line. Then, the transfer of the telephone communication from the transferring first to the receiving second radio telephone set ends and the receiving second radio telephone set can execute a telephone communication with the outside-line subscriber at the other end of the office line.

However, no one may be available at the receiving radio telephone set to answer. It is assumed that the user at the transferring radio telephone set transfers the telephone communication to the receiving radio telephone set without knowing that no one is at the receiving radio telephone set. In that case, no one responds to the ringing tone generated by the receiving radio telephone set due to the bell ringing signal from the base unit and as a result the outside-line subscriber is kept on hold so long as the ringing is not responded to. The user at the transferring radio telephone set cannot at all know what the result of the transfer is because the transferring radio telephone set has already moved to a standby state. Therefore, there is a problem that each time the transfer occurs, it is necessary to go and see whether anybody is at the receiving radio telephone set for answer and whether the transfer has been achieved.

If there is no one at the receiving telephone set when the ringing tone is generated, there is a problem that the telephone communication cannot be retransferred to the transferring telephone set.

In order to solve these problems, an arrangement can be conceived by providing an additional pair of transferring and receiving radio telephone sets to enable establishing two radio circuits. However, this would increase the cost greatly and also the size of the base unit undesirably.

Therefore, it is an object of the present invention to provide a cordless telephone apparatus and a method of controlling same which eliminate the above problems, and are capable of ascertaining a transferred state and, if necessary, retransfer the telephone communication to the transferring radio telephone set.

SUMMARY OF THE INVENTION

In order to achieve the above object, the present invention provides a cordless telephone apparatus that includes a base unit connected to a telephone network; a plurality of radio telephone sets connectable via a radio circuit to the base unit; means for forming a communication channel for one of the radio telephone sets via the network by establishing a radio circuit between the base unit and the radio telephone set; means for holding the communication channel in response to a request for hold sent from the one radio telephone set, and for generating a request for transfer to another one of the radio telephone sets from the one radio telephone set; means responsive to the request for transfer for establishing a radio circuit between the base unit and each of the transferring and the other (receiving) radio telephone sets, and for delivering a ringing signal from the base unit to the receiving and transferring radio telephone sets; and means for releasing the holding of the communication channel, stopping the generation of the ringing signal and forming the communication channel to the receiving radio telephone set when the receiving radio telephone set responds to the ringing signal, or if no response occurs, releasing the hold condition on the channel so that communication can again occur via the first (transferring) set.

The present invention provides a method of controlling a cordless telephone apparatus including a base unit connected to a telephone line, a plurality of radio telephone sets connectable to the base unit via a radio circuit, the plurality of radio telephone sets including a transferring radio telephone set and a receiving radio telephone set, comprising the steps of: generating a request for hold while the transferring radio telephone set is in telephone communication via the telephone line, from the transferring radio telephone set to the base unit and generating a request for transfer from the transferring radio telephone set to the base unit; and holding the telephone line at the base unit in response to the request for hold and generating a ringing signal from the base unit to the transferring and receiving radio telephone sets in response to the request for transfer; and releasing the holding of the telephone line, and forming the telephone line communication via the telephone line to the receiving radio telephone set when the receiving radio telephone set responds to the ringing signal; and releasing the hold condition of the line, and again restoring the communication to the transferring radio telephone set when the transferring radio telephone set responds to the ringing signal.

The cordless telephone according to the present invention is configured such that when the base unit calls the receiving radio telephone set, it also calls the transferring radio telephone set. The user at the transferring radio telephone set can hear the ringing tone and recognize that the receiving radio telephone set is being called. When the ringing tone does not stop for a long period of time, he also recognizes that no one is at the receiving radio telephone set. At that time, the user at the transferring radio telephone set can inform the outside-line subscriber that no one is at the receiving radio telephone set.

DESCRIPTION OF THE PREFERRED EMBODIMENT

Figure 1:
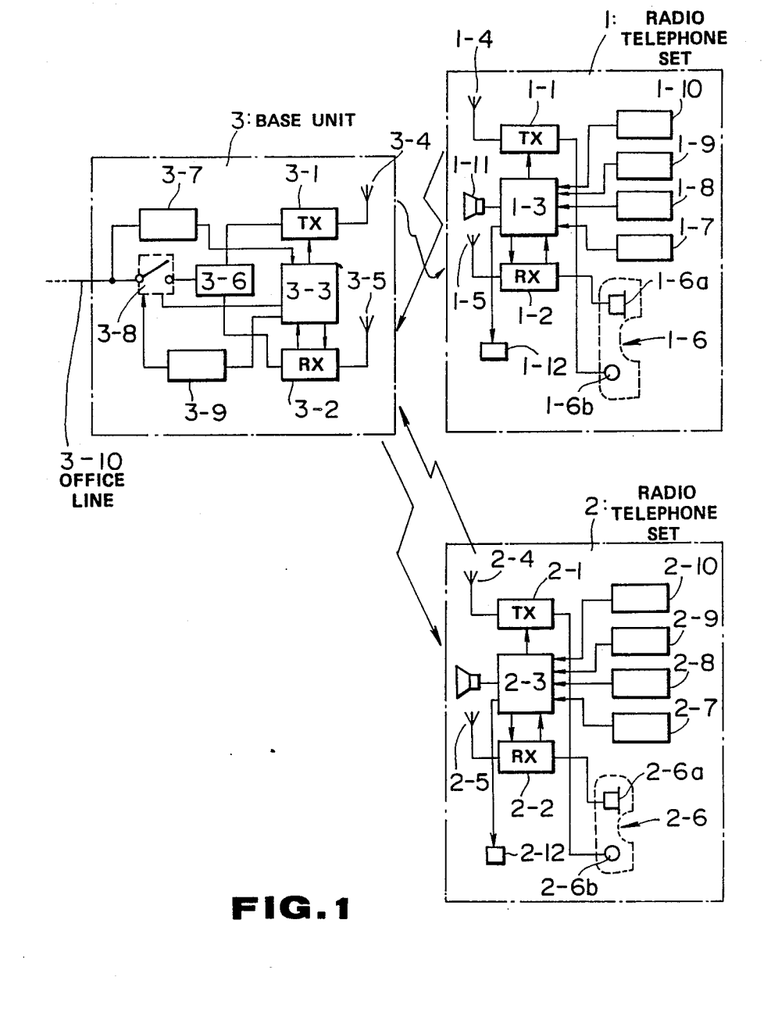
FIG. 1 is a block diagram showing a general structure of a cordless telephone apparatus according to one embodiment of the present invention.

In FIG. 1, reference numerals 1 and 2 denote radio telephone sets which include transmitters 1-1, 2-1; receivers 1-2, 2-2; control units 1-3, 2-3; transmission antennas 1-4, 2-4; reception antennas 1-5, 2-5; handsets 1-6, 2-6 including telephone receivers 1-6a, 2-6a and telephone transmitters 1-6b, 2-6b; hook switches 1-7, 2-7; dial keys 1-8, 2-8; hold keys 1-9, 2-9; extension keys 1-10, 2-10; speakers 1-11, 2-11, and lamps or display units 1-12, 2-12, respectively. Reference numeral 3 denotes a base unit which includes a transmitter 3-1, a receiver 3-2, a control unit 3-3, a transmission antenna 3-4, a reception antenna 3-5, a 2-wire to 4-wire converter 3-6, a ringing signal detector 3-7, a line relay 3-8, and a hold circuit 3-9. The converter 3-6 is connected via the line relay 3-8 to an office line 3-10.

The basic control operation of this embodiment will now be described with reference to the sequence diagram of FIGS. 2 and 3.

(a) When radio telephone set 1 issues a call

If the operator at radio telephone set 1 causes hand set 1-6 to go off-hook in order to issue a call, state of the hook switch 1-7 changes and this information is transmitted to control unit 1-3. The control unit 1-3 drives transmitter 1-1 and transmits a call signal including an identification code corresponding to the radio telephone set 1 via the antenna 1-4 using an electromagnetic wave in a control channel.

When the base unit 3 receives the identification code of radio telephone set 1 via the antenna 3-5 and the receiver 3-2, it transmits a call-responsive signal including a channel designating code which designates an idle communication channel and the identification code as electromagnetic waves in the control channel via the transmitter 3-1 and antenna 3-4. When the radio telephone set 1 receives the electromagnetic waves via the antenna 1-5 and receiver 1-2, it selects and sets the designated communication channel. It further ascertains whether the selected designated communication channel is idle and transmits a channel selection end signal to the base unit.

The base unit 3 also ascertains whether the designated communication channel is idle. Radio telephone set 1 ascertains whether there is any fading occurring in the designated communication channel. If not, the radio telephone set 1 transmits a fading detection end signal to the base unit 3. When the base unit 3 receives the fading detection end signal, it shifts to a next operation by recognizing that a radio circuit is established between the base unit and radio telephone set 1.

The base unit closes its line relay 3-8, forms a closed direct-current loop with a telephone exchange coupled to the local telephone line, simultaneously transmits a "voice circuit on" signal to radio telephone set 1, and drives a voice circuit including the telephone transmitter 1-6a and receiver 1-6b in handset 1-6 of radio telephone set 1.

A dial tone signal is delivered by the exchange via the closed direct-current loop including the office line 3-10 is modulated by the base unit 3 and output as a sound from the telephone receiver 1-6a in handset 1-6 of radio telephone set 1.

Then, by dialing a predetermined dial number at radio telephone set 1 using the dial keys 1-8, a dialed number signal is delivered to the exchange via the radio circuit and base unit. When the delivery of the dialed number signal is completed, the exchange performs an exchange switching operation and calls a desired remote telephone subscriber or other remote station corresponding to the dialed number signal. Thus, if the desired subscriber responds, a telephone communication is possible.

When the telephone communication is to be ended, the handset 1-6 of radio telephone set 1 is caused to go on-hook. The control unit 1-3 detects and determines that hook switch 1-7 has changed its state, and delivers an on-hook signal to base unit 3. The control unit 1-3 delivers a dial tone signal to base unit 3 a predetermined time after the on-hook signal has been delivered. When base unit 3 receives the dial tone signal, it opens line relay 3-8 to thereby release the local telephone line.

(b) When there is an incoming call from the office line

When there is an incoming call at the cordless telephone on standby from the local telephone line, the ringing signal detector 3-7 of base unit 3 detects a ringing signal delivered by the exchange, and transmits to radio telephone sets 1 and 2 via the control channel an incoming call signal including the number of communication channels detected as being idle and stored by the telephone on standby and the respective identification codes of the radio telephone sets.

When the radio telephone sets 1 and 2 receive that incoming call signal via the control channels, they select and set the designated channels of receivers 1-2, 2-2 and check to see if the designated channels are idle. If the channels are idle, the radio telephone sets 1 and 2 send to the base unit 3 a "channel selecting end" signal. Base unit 3 also selects and sets its designated communication channel and checks to see if the selected designated communication channel is idle. When the base unit receives the fading detection end signal from radio telephone sets 1 and 2, it determines that a radio circuit is established, and sends out a bell ringing signal to radio telephone sets 1 and/or 2 in order to deliver a ringing signal to radio telephone sets 1 and 2.

When the radio telephone sets 1 and 2 receive the bell ringing signal, they generate a ringing tone from the speakers 1-11, 2-11 to inform the user at the radio telephone sets 1 and 2 of receipt of the incoming call from the office line.

When the user at the radio telephone set 1 responds to the ringing and causes handset 1-6 to go off-hook, the hook switch 1-7 changes its state. The control unit 1-3 detects this change and transmits an off-hook signal to the base unit 3.

When the base unit 3 receives that off-hook signal, it closes line relay 3-8 and forms the closed direct-current loop between the exchange and base unit 3. At the same time, base unit 3 delivers a "voice circuit on" signal to radio telephone set 1. When radio telephone set 1 receives the "voice circuit on" signal, it turns on the voice circuit including the telephone transmitter 1-6b and receiver 1-6a of handset 1-6 to enable telephone communication. The ending operation of the telephone communication is the same as in (a) above.

While the foregoing relates to the basic control operation of the cordless telephone, the transfer control operation essential for the present invention will now be described with reference to the sequence diagrams of FIGS. 4A, B and C and 5A, B and C.

Figure 4A:
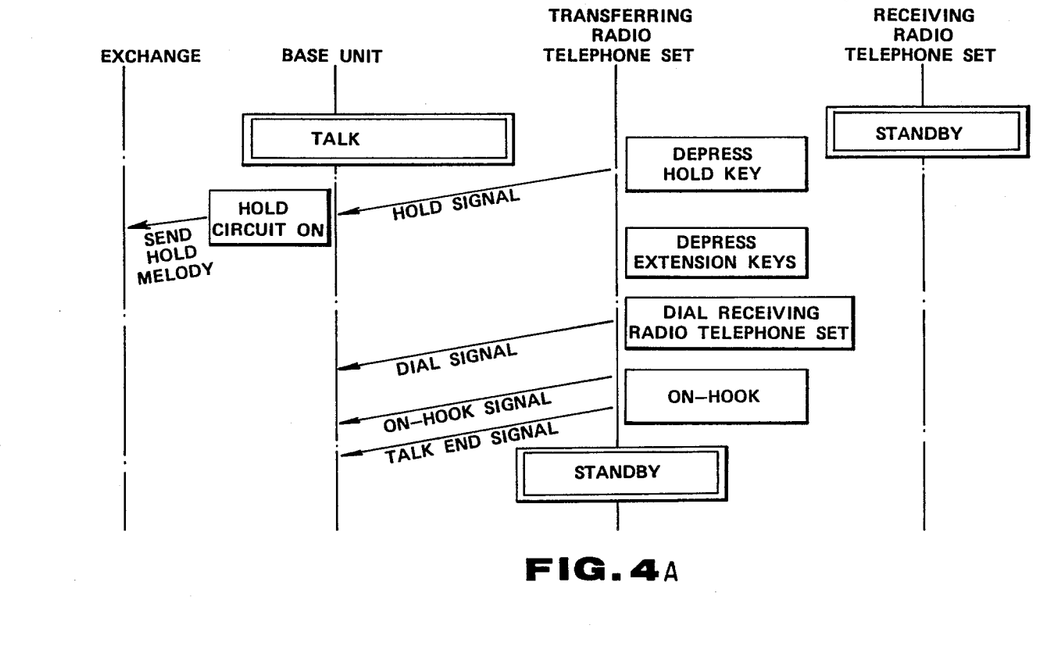
FIGS. 4A, 4B and 4C are diagrams of a control sequence involving hold and transfer according to the invention.
Figure 4B:
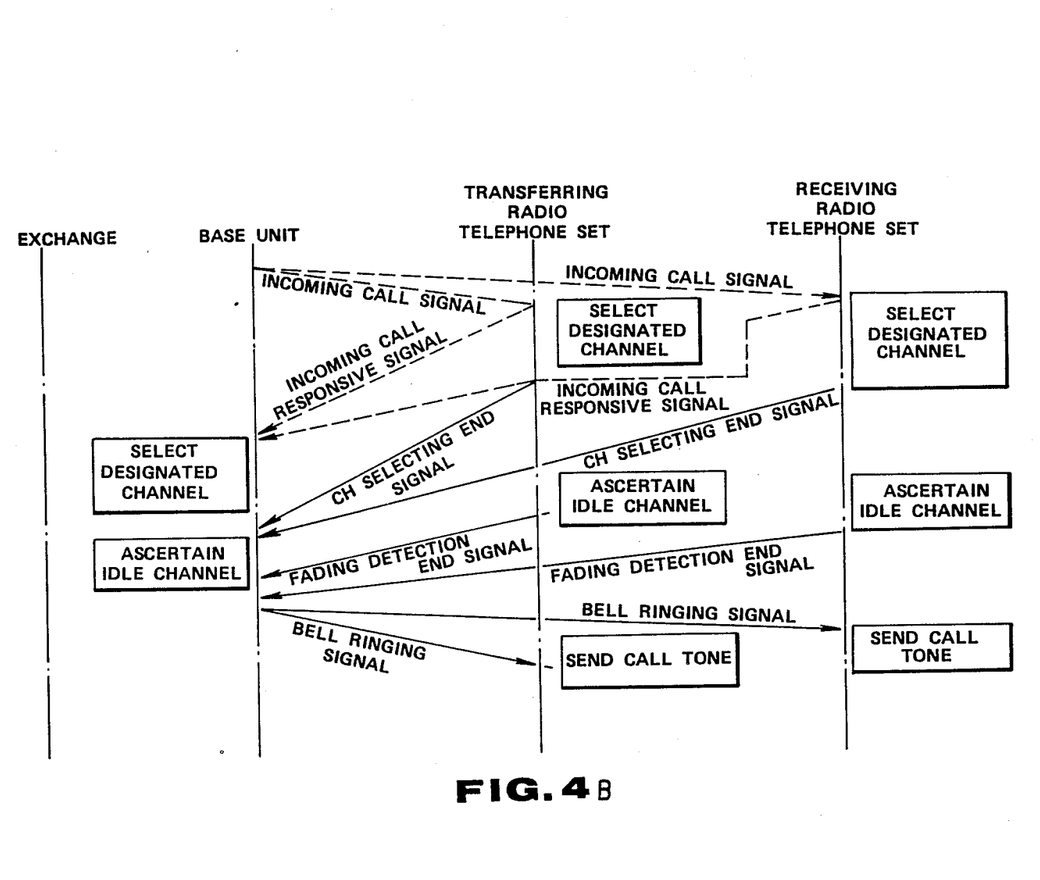
Figure 4C:
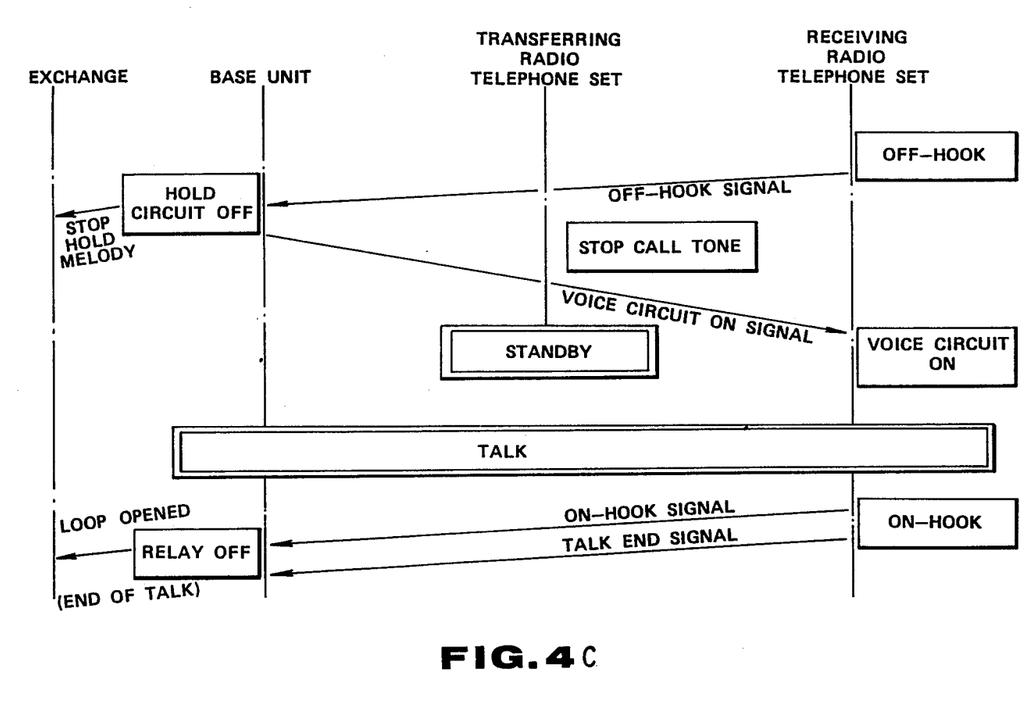
Figure 5A:
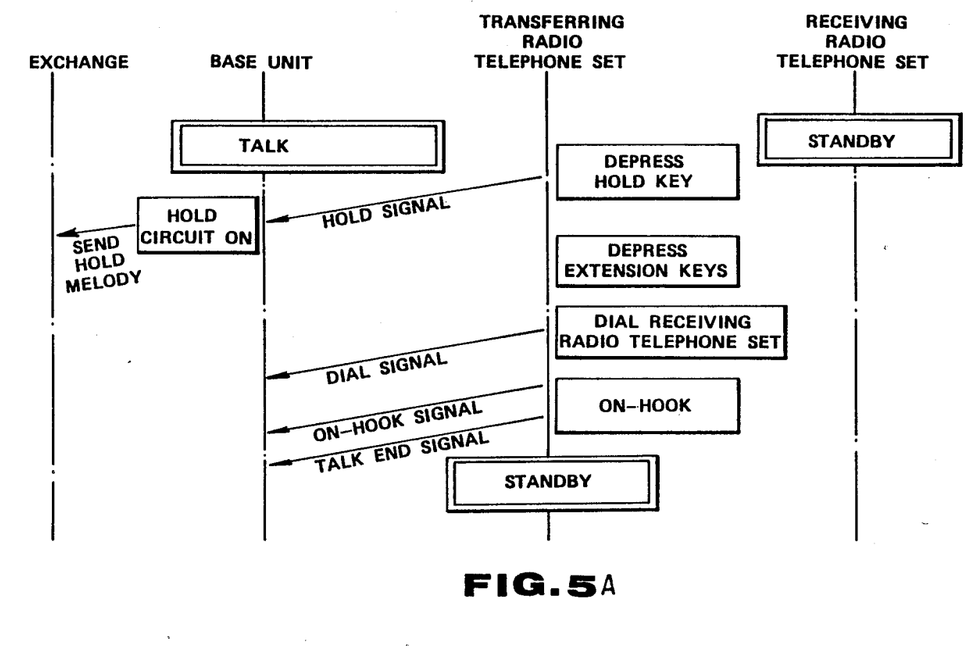
FIG. 5A, 5B and 5C are diagrams of a control sequence involving hold, transfer and retransfer in the embodiment.

FIGS. 4A, B and C involve the operation performed when the receiving telephone set 2 responds to the transfer of the incoming call, and FIGS. 5A, B and C involve the operation performed when there is no user available at the receiving radio telephone set 2, the transferred call is not responded at set 2, and the user at the transferring radio telephone set 1 has responded to the call.

FIGS. 4A, B and C and 5A, B and C show the sequences after the telephone communication has been established because the function of transfer is used in that stage.

First, the control sequence of FIG. 4A, B and C will be described in detail. It is assumed that the radio telephone set 1 is in telephone communication with the outside-line subscriber via the base unit 3. When the user at the radio telephone set 1 transfers the outside-line subscriber now under telephone communication to the user at the radio telephone set 2, the user at radio telephone set 1 presses the hold key 1-9 temporarily in order to keep closed the network direct-current loop. In response to this, a hold signal is delivered from radio telephone set 1 to base unit 3 via the radio circuit. When base unit 3 receives the hold signal it turns on hold circuit 3-9 in order to keep closed the direct-current loop. At that time, a melody signal, for example, indicative of establishing a hold state is delivered to the remote subscriber at the other end of the communication channel. The user at the radio telephone set 1 presses extension keys 1-10 to set an extension line and dials the extension number of the radio telephone set 2 to which the incoming call is to be transferred, and the handset 1-6 is then caused to go on-hook to end telephone communication of radio telephone set 1. The base unit 3 sequentially receives the dial signal, the on-hook signal, and the talk end signal from radio telephone set 1, stops transmission of the electromagnetic waves via the communication channel used so far, and releases that channel.

The base unit 3 sends, via the control channel, an incoming call signal including the respective identification codes of receiving and transferring radio telephone sets 2 and 1 and channel designating codes. When radio telephone sets 1 and 2 receive that signal they transmit an incoming call responsive signal to base unit 3 and select and set respective communication channels of the receivers 1-2 and 2-2 such that they can receive the set communication channels. When the radio telephone sets 1 and 2 have completed the setting of respective communication channels, they transmit a channel selecting end signal to the base unit 3. The radio telephone sets 1 and 2 ascertain that the set communication channels are idle and transmit a fading detection end signal to the base unit 3, which then moves to a communication channel designated by itself and ascertains that that channel is idle, and forms radio channels for receiving the signals transmitted by the radio telephone sets 1 and 2 for transmission of any required matter.

The base unit 3 then delivers a bell ringing signal to radio telephone sets 1 and 2. When the radio telephone sets 1 and 2 receive that bell ringing signal, they generate a ringing tone. The user at radio telephone set 2 who hears the ringing tone at that time would recognize that the user must respond because he is being called via the extension line while the user at radio telephone set 1 would recognize that the ringing tone is one which calls the radio telephone set 2 due to the user's transfer operation.

When the user at radio telephone set 2 responds by causing the handset to go off-hook, an off-hook signal is delivered from the radio telephone set 2 to the base unit 3. When the base unit 3 receives that off-hook signal, it stops the bell ringing signal generated so far, turns off the hold circuit 3-9, releases the hold state of the office line kept so far, stops transmission of the hold melody signal to the outside-line subscriber, and results in a communication enable state. When the radio telephone sets 1 and 2 stop the ringing tone by recognizing the stopping of the bell ringing signal, the user at radio telephone set 1 recognizes that the user at the radio telephone set 2 has responded, because the ringing tone from the radio telephone set 1 has stopped, and also recognizes that the telephone communication with the outside-line subscriber is reliably transferred to the radio telephone set 2.

On the other hand, the radio telephone set 2, which has caused the handset to go off-hook, receives the voice circuit on signal from the base unit to thereby enable telephone communication with the remote subscriber at the other end of the communication channel.

Figure 2:
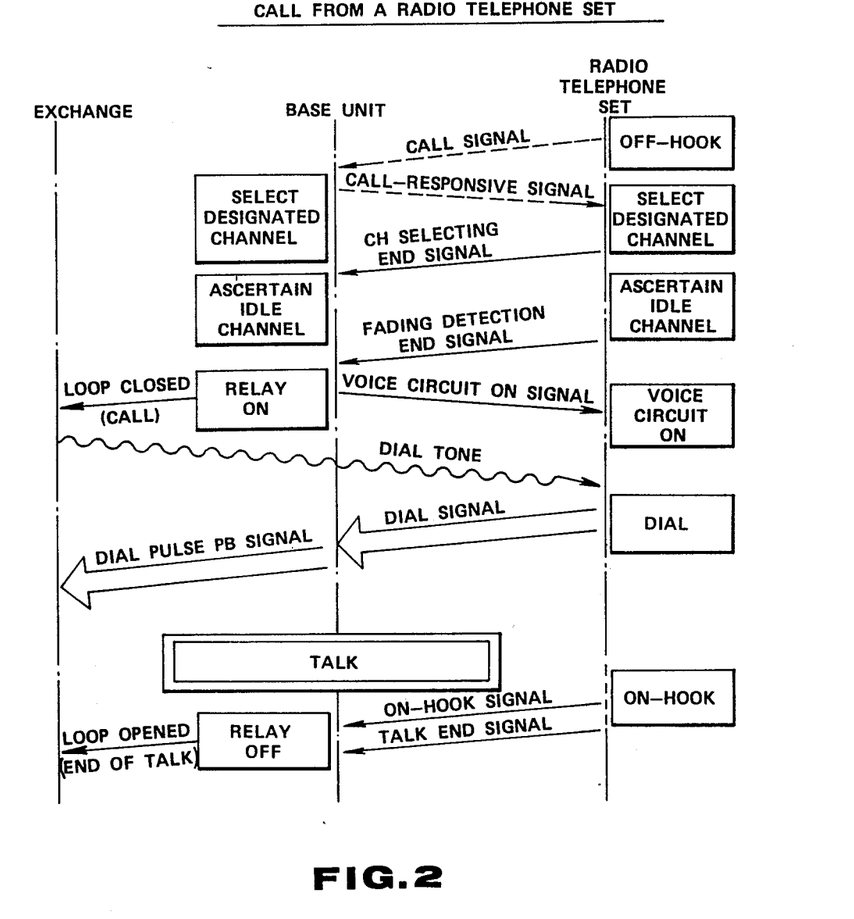
FIG. 2 is a diagram of a typical control sequence performed during an outgoing call in the embodiment of FIG. 1.
Figure 3:
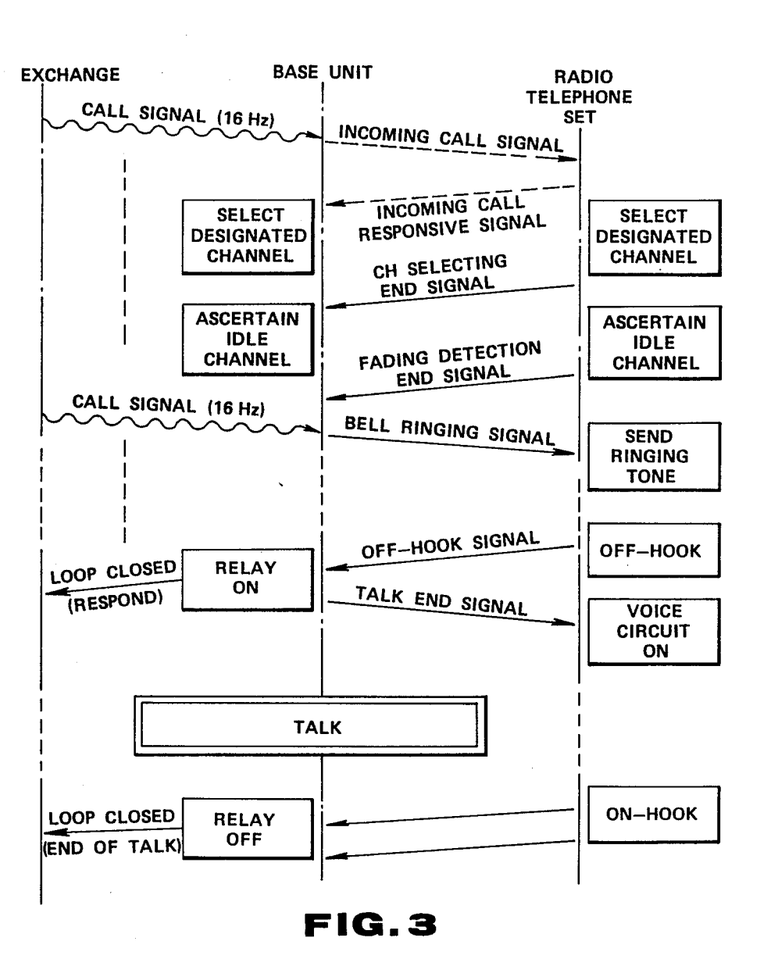
FIG. 3 is a diagram of a typical control sequence performed during an incoming call at the radio telephone set in the embodiment of FIG. 1.

Ending of the telephone conversation is similar to that in FIGS. 2 and 3.

Figure 5B:
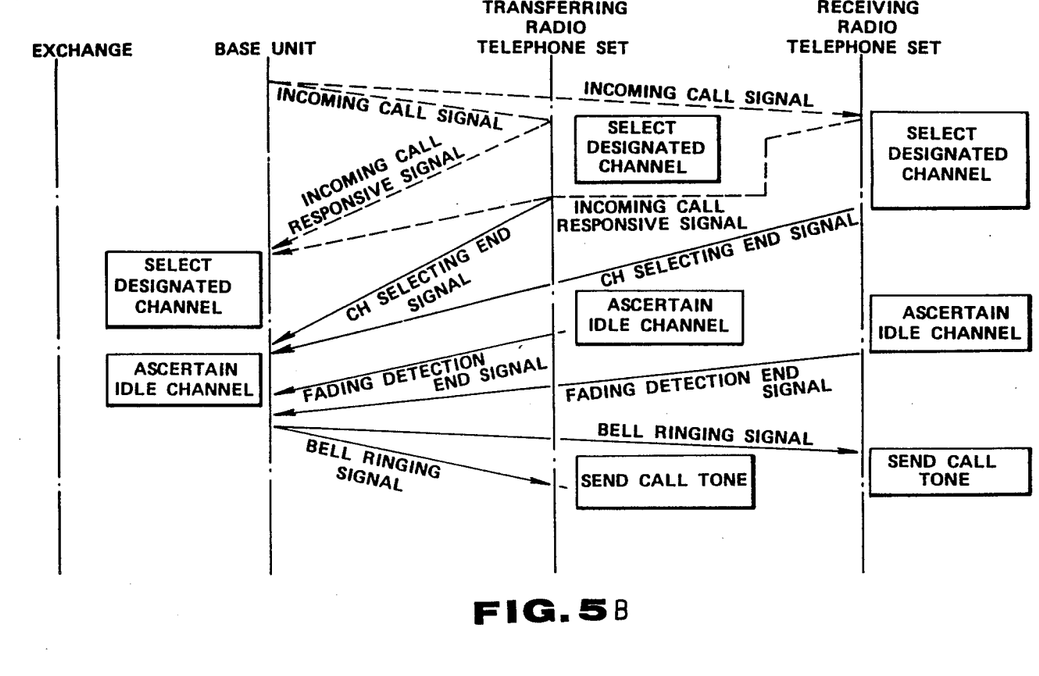
Figure 5C:
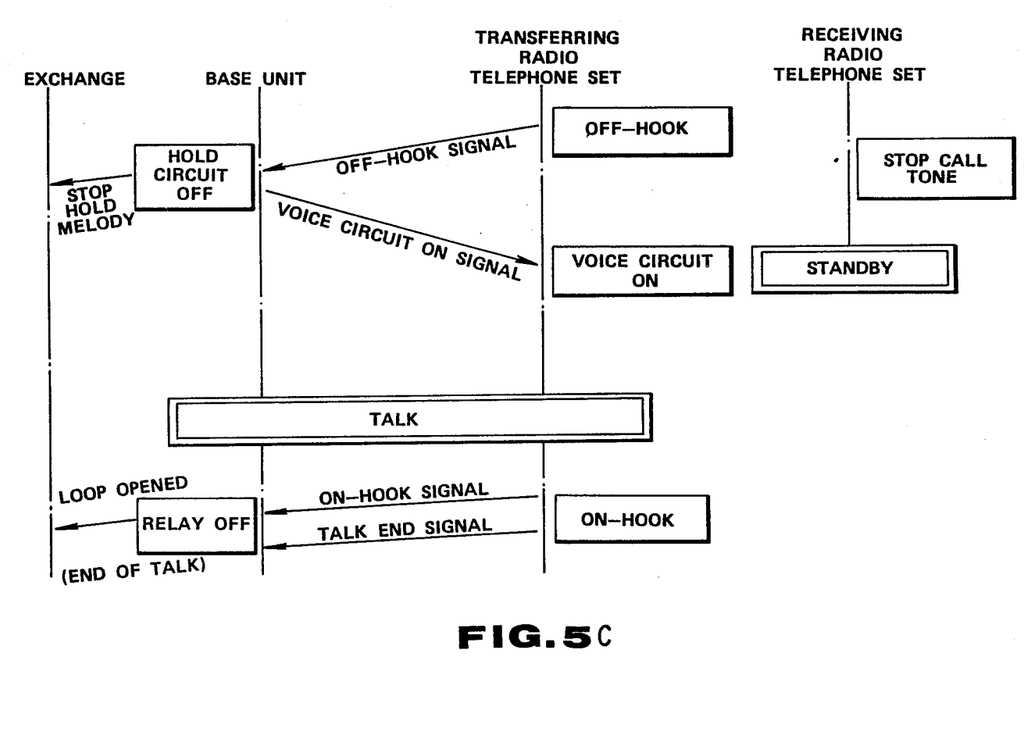

Retransfer of the incoming call when no one is at the receiving radio telephone set 2 will now be described with reference to FIGS. 5A, B and C.

Since the sequence in which after the transfer operation has been made at radio telephone set 1, and base unit 3 calls radio telephone sets 1 and 2, is the same as that in FIGS. 4A, B and C, further description thereon will be omitted. The user at receiving radio telephone set 1 hears the ringing tone at radio telephone set 1, knows that the call is being made for transferring purposes, but recognizes that the user at radio telephone set 2 is absent because the ringing tone does not stop at all, and responds by taking up handset 1-6 of radio telephone set 1. By this off-hook operation, the off-hook signal is delivered from radio telephone set 1 to base unit 3. When base unit 3 receives that off-hook signal, it stops the bell ringing signal, turns off the hold circuit 3-9, stops transmission of the hold melody signal, and delivers the "voice circuit on" signal to radio telephone set 1. By the stopping of the bell ringing signal, the telephone set 1 stops the ringing tone and turns on the voice circuit in response to the voice circuit on signal.

Thus, since the telephone communication with the outside-line subscriber, which is intended to be transferred to radio telephone set 2, is retransferred to the radio telephone set 1, the cordless telephone can inform the outside-line subscriber that the user at radio telephone set 2 is unavailable.

While in the above embodiment the transferring radio telephone set 1 is constructed to generate a ringing tone the same as in receiving radio telephone set 2, the transferring radio telephone set 1 may be constructed so as to generate a ringing tone different in sounding aspects such as tone color and period from radio telephone set 2.

The transferring radio telephone set 1 may be constructed so as to inform the user at receiving radio telephone set 2 that the incoming call is being transferred by turning on and/or off lamp 1-2 or 2-12 of FIG. 1 instead of the ringing tone being generated.

In that case, base unit 3 may deliver the ringing signal accompanied by a signal indicative of the receiving radio telephone set 2 and/or transferring radio telephone set 1. The transferring radio telephone set 1 may store what it has transferred and may change the manner in which the transferring radio telephone set 1 reports the incoming call, for example, by turning on and/or off the lamp, or ringing a bell, on the basis of the stored contents.

As just described above, the transferring radio telephone set is also called when the receiving radio telephone set is to be called, so that the user at the transferring radio telephone set can very easily ascertain the state of the transfer and can respond to the outside line subscriber by retransferring the incoming call to the transferring radio telephone set when the user at the receiving radio telephone set is absent.

What is claimed is:

1. A cordless telephone apparatus coupled to a telephone network via a local telephone line, comprising:
    a base unit connected to the local line;
    a plurality of radio telephone sets coupled to the base unit;
    means for forming a communication channel for facilitating telephone communication between one of the plurality of radio telephone sets and a remote telephone set on the network via the local line by establishing a radio circuit between the base unit and said one of the plurality of radio telephone sets;
    means for generating a request for hold from said one of the radio telephone sets to the base unit to temporarily suspend the telephone communication between said one radio telephone set and the remote set and for generating a request for transfer to a receiving one of the radio telephone sets from the transferring radio telephone set to the base unit in response to the request for hold;
    means responsive to the request for transfer for establishing a radio circuit among the base unit and the transferring and receiving radio telephone sets, and for delivering a ringing signal from the base unit to the receiving and transferring radio telephone sets simultaneously via the radio circuit; and
    means for releasing the temporary suspension of the telephone communication, inhibiting the delivery of the ringing signal, and forming a communication channel for facilitating the telephone communication between the remote set and at least one of the transferring and receiving radio telephone sets when said at least one of the transferring and receiving radio telephone sets responds to the ringing signal.

2. A cordless telephone apparatus according to claim 1, wherein the radio circuit includes a plurality of channels; and
    said radio circuit between the base unit and said one of the radio telephone sets is established by selecting one of the plurality of channels.

3. A cordless telephone apparatus according to claim 1, wherein the radio circuit includes one control channel and a plurality of communication channels; and said means for forming a communication channel between one of the plurality of radio telephone sets and a remote telephone set selects said one radio telephone set for telephone communication with the remote set through the control channel, and connects the selected radio telephone set to the base unit through one of the plurality of communication channels;

4. A cordless telephone apparatus according to claim 1, wherein each of the plurality of radio telephone sets includes a hold key; and
    the transferring radio telephone set generates the request for hold in response to manipulation of said hold key.

5. A cordless telephone apparatus according to claim 1, wherein each of the plurality of radio telephone sets includes an extension key; and
    the transferring radio telephone set generates the request for transfer to the receiving radio telephone set in response to manipulation of the extension key to generate a dial number corresponding to the receiving radio telephone set.

6. A cordless telephone apparatus according to claim 2, wherein said means for delivering a ringing signal designates one of the plurality of communication channels for the transferring and receiving telephone sets, couples the base unit to the transferring and receiving radio telephone sets through said designated communication channel, and generates the ringing signal through said designated communication channel.

7. A cordless telephone apparatus according to claim 1, wherein each of said plurality of radio telephone sets includes means for generating a ringing tone; and
    the transferring and receiving telephone sets generate the ringing tone in response to said delivered ringing signal.

8. A cordless telephone apparatus according to claim 7, wherein the ringing tone generated from the transferring telephone set is different with respect to at least one of tone color, timing and manner of generation from the ringing tone generated from the receiving telephone set.

9. A cordless telephone apparatus according to claim 7, wherein each of the radio telephone sets further includes display means; and
    the transferring radio telephone set in responsive to the ringing signal causes the display means to display information representing that a telephone communication is transferred to the receiving radio telephone set.

10. A method of controlling a cordless telephone apparatus including a base unit connected to a local telephone line, a plurality of radio telephone sets connectable to the base unit via a radio circuit, comprising the steps of:

establishing the radio circuit between the base unit and one of the plurality of radio telephone sets to form a communication channel for facilitating telephone communication between said one of the plurality of radio telephone sets and a remote telephone set coupled to a remote end of the local line;

generating a request for hold from a transferring one of the radio telephone sets to the base unit to temporarily suspend the telephone communication between the transferring radio telephone set and the remote telephone set, and generating a request for transfer to a receiving one of the radio telephone sets from the transferring radio telephone set to the base unit in response to the request to hold;

establishing a radio circuit between the base unit and the transferring and receiving radio telephone sets, and delivering a ringing signal from the base unit to the transferring and receiving radio telephone sets via the radio circuit in response to the request for transfer; and releasing the temporary suspension of the telephone communication, inhibiting the delivery of the ringing signal and forming a communication channel for facilitating the telephone communication between the remote telephone set and at least one of the transferring and receiving telephone sets when the at least one of the transferring and receiving telephone sets responds to the ringing signal.

11. The method of claim 10, wherein each of the radio telephone sets includes a hold key; and the step of generating the request for hold includes the substep of manipulating said hold key included in said transferring radio telephone set.

12. The method of claim 10, wherein each of the radio telephone sets includes an extension key; and the step of generating the request for transfer includes the substep of generating a dial number corresponding to the receiving radio telephone set in response to manipulation of said extension key of the transferring radio telephone set.

13. The method of claim 10, wherein the step of establishing the radio circuit between the base unit and one of the plurality of radio telephone sets includes the substeps of designating a communication channel for the transferring and receiving radio telephone sets, coupling the base unit to the transferring and receiving telephone sets through said designated communication channel, and generating the ringing signal through the designated communication channel.

14. The method of claim 10, wherein the step of delivering a ringing signal includes the substep of generating a ringing tone at the transferring and receiving radio telephone sets.

15. The method of claim 14, wherein the substep of generating a ringing tone includes the sub-substep of generating a different ringing tone with respect to at least one of tone color, timing and manner of generation for each of the transferring and receiving telephone sets.

16. The method of claim 10, wherein the step of establishing the radio circuit, delivering a ringing signal and releasing the temporary suspension includes the substeps of generating a ringing tone at each radio telephone set responsive to the ringing signal; and in response to the ringing signal, displaying at each receiving radio telephone set information representing that a telephone communication is being transferred.

17. A cordless telephone apparatus coupled to a telephone network via a local telephone line comprising:

a base unit connected to the local line;

a plurality of radio telephone sets coupled to the base unit;

means for forming a communication channel for facilitating telephone communication between one of the plurality of radio telephone sets and a remote telephone set on the network via the local line by establishing a radio circuit between the base unit and said one of the plurality of radio telephone sets;

means for generating a request for hold from said one of the radio telephone sets to the base unit to temporarily suspend the telephone communication between said one radio telephone set and the remote set and for generating a request for transfer to a receiving one of the radio telephone sets from the transferring radio telephone set to the base unit in response to the request for hold;

means responsive to the request of transfer for establishing a radio circuit among the base unit and the transferring and receiving radio telephone sets, and for delivering a ringing signal from the base unit to the receiving and transferring radio telephone sets simultaneously via the radio circuit; and means for releasing the temporary suspension of the telephone communication, inhibiting the delivery of the ringing signal, and forming the communication channel for facilitating the telephone communication between the remote set and at least one of the transferring and receiving radio telephone sets whenever said at least one of the transferring and receiving radio telephone sets responds to the ringing signal, said means for forming a communication channel forming a communication channel for said one of the plurality of radio telephone sets in response to an incoming call to said one radio telephone set over the local telephone line.

18. A cordless telephone apparatus coupled to a telephone network via a local telephone line comprising:

a base unit connected to the local line;

a plurality of radio telephone sets coupled to the base unit;

means for forming a communication channel for facilitating telephone communication between one of the plurality of radio telephone sets and a remote telephone set on the network via the local line by establishing a radio circuit between the base unit and said one of the plurality of radio telephone sets;

means for generating a request for hold from said one of the radio telephone sets to the base unit to temporarily suspend the telephone communication between said one radio telephone set and the remote set and for generating a request for transfer to a receiving one of the radio telephone sets from the transferring radio telephone set to the base unit in response to the request for hold;

means responsive to the request of transfer for establishing a radio circuit among the base unit and the transferring and receiving radio telephone sets, and for delivering a ringing signal from the base unit to the receiving and transferring radio telephone sets simultaneously via the radio circuit; and means for releasing the temporary suspension of the telephone communication, inhibiting the delivery of the ringing signal, and forming the communication channel for facilitating the telephone communication between the remote set and at least one of the transferring and receiving radio telephone sets whenever said at least one of the transferring and receiving radio telephone sets responds to the ringing signal, said means for forming a communication channel forming a communication channel for said one of the plurality of radio telephone sets in response to a call at times when said one radio telephone set issues said call.

* * * * *